(12) United States Patent
Leliveld et al.

(10) Patent No.: US 7,105,712 B2
(45) Date of Patent: Sep. 12, 2006

(54) PROCESS FOR THE HYDROGENATION OF AROMATICS

(75) Inventors: Robertus Gerardus Leliveld, Utrecht (NL); Ron Staadegaard, Alkmaar (NL); Marinus Bruce Cerfontain, Amsterdam (NL); Xavier Gilles Gérard Léopold Vanhaeren, Genval (BE)

(73) Assignee: Albemarle Corporation, Richmond, VA (US)

( * ) Notice: Subject to any disclaimer, the term of this patent is extended or adjusted under 35 U.S.C. 154(b) by 288 days.

(21) Appl. No.: 10/478,655

(22) PCT Filed: May 29, 2002

(86) PCT No.: PCT/EP02/05906

§ 371 (c)(1),
(2), (4) Date: May 4, 2004

(87) PCT Pub. No.: WO02/102939

PCT Pub. Date: Dec. 27, 2002

(65) Prior Publication Data

US 2004/0181103 A1 Sep. 16, 2004

(30) Foreign Application Priority Data

Jun. 1, 2001 (EP) ................... 01202051

(51) Int. Cl.
*C07C 5/10* (2006.01)
(52) U.S. Cl. ...................... 585/269; 585/266
(58) Field of Classification Search ............... 585/269, 585/266
See application file for complete search history.

(56) References Cited

U.S. PATENT DOCUMENTS

| 3,637,484 A | 1/1972 | Hansford .................... 208/143 |
| 3,703,461 A | 11/1972 | Hansford .................... 208/143 |
| 5,308,814 A | 5/1994 | Kukes et al. ................. 502/66 |

FOREIGN PATENT DOCUMENTS

| EP | 0519573 | 12/1992 |
| EP | 0587246 | 3/1994 |
| EP | 0653242 | 5/1995 |
| EP | 0727474 | 8/1996 |
| EP | 0875288 | 11/1998 |
| EP | 0847248 | 10/1999 |
| EP | 0955090 | 11/1999 |
| JP | 09225304 | 9/1997 |
| WO | WO97/05948 | 2/1997 |
| WO | WO98/35754 | 8/1998 |

OTHER PUBLICATIONS

Journal of Catalysis 9, mears, et al., "*The Stoichoiometry for Hydrogen Titrationof Oxygen on Supported Platinum*," 1967m pp. 125-134.
Journal of Catalysis 181, G. Prelazzi, et al, "*Comparison of $H_2$ Adsorption, $O_2$ Adsorption, $H_2$ Titraton, and $O_2$ Titrationon Supported Palladium Catalysts*," 1999, pp. 73-79.
Symposium on Recent Advances in Herteroatom Removal Presented Before the Division of Petroleum Chemistry, Inc., 215th National Meeting, American Chemical Society, Dallas, TX, Mar. 29-Apr. 3, 1998, M. Vaarkham, et al., "Sulfur Tolerance of Nobel Metal Aromatics Hydrogenation Catalysts".
Applied Catalysis A: General 185, Hiroyuki Yasuda, et al., "*Sulfur-Tolerant $Pd-Pt/Al_2O_3-B_2O_3$ Catalyst for Aromaic Hydrogenation*", 1999, pp. L199-L201.
Derwent Abstract of Japanese Patent Application No. 0925304, dated Sep. 2, 1997.
Search Report of Corresponding International Application PCT/EP02/05906.

*Primary Examiner*—Thuan D Dang
(74) *Attorney, Agent, or Firm*—Frank C. Eymard

(57) ABSTRACT

The present invention pertains to a process for effecting aromatics hydrogenation which process comprises contacting a hydrocarbon feedstock which contains 10–80 vol. % of aromatics in the presence of a hydrogen-containing gas with a catalyst which comprises hydrogenation metals on a carrier, wherein
(i) the hydrogenation metals comprise a combination of platinum and palladium, and
(ii) the carrier comprises silica-alumina dispersed in an alumina binder, wherein the alumina binder is present in an amount of 5–50 wt. %, based on the total weight of the silica-alumina and alumina binder present in the carrier, and wherein the silica-alumina comprises 5–50 wt. % of alumina, based on the weight of the silica-alumina.

8 Claims, 1 Drawing Sheet

PROCESS FOR THE HYDROGENATION OF AROMATICS

CROSS REFERENCE TO RELATED APPLICATIONS

Figure 1:
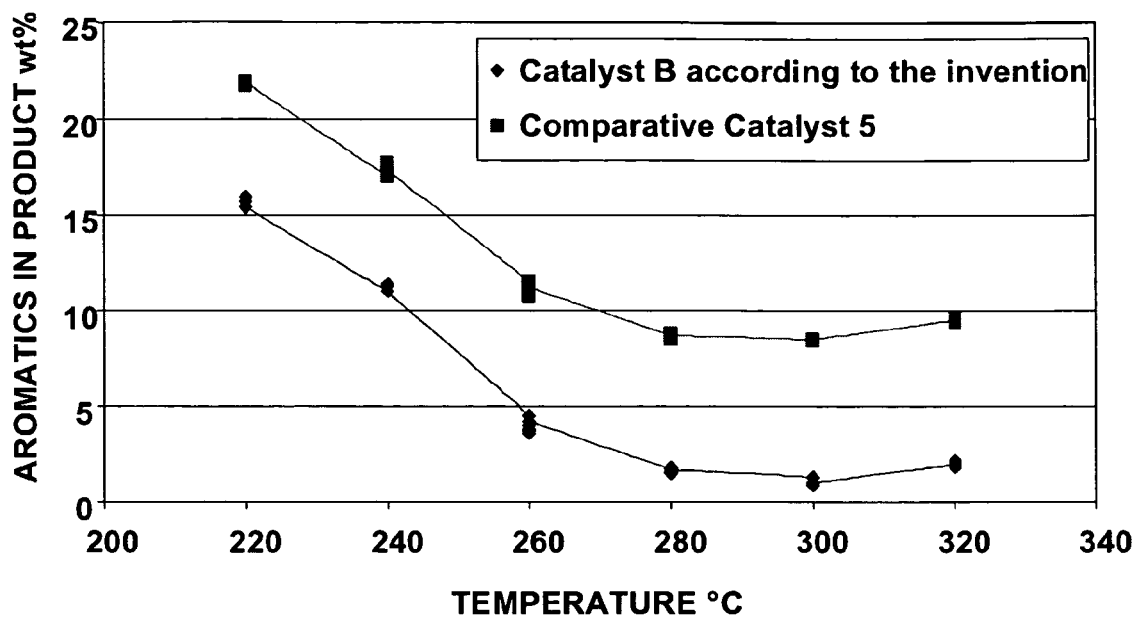

This application is a national filing based on PCT Application PCT/EP02/05906, filed on May 29, 2002, that claims priority from EP01202051.7, filed on Jun. 1, 2001 and U.S. 60/301,335, filed on Jun. 27, 2001.

BACKGROUND OF THE INVENTION

1. Field of the Invention

The present invention pertains to a process for the hydrogenation of an aromatics-containing feedstock in which process a specific catalyst suitable for the hydrogenation of aromatics is applied.

2. Prior Art

Typically, fuels such as diesel fuels and kerosene are commonly prepared by cracking or hydrocracking high boiling feedstocks, such as vacuum gas oils or residues, with the aid of a cracking catalyst or a hydrocracking catalyst, and separating the resulting product into fractions if so required. However, in general, the fraction thus obtained is suitable neither for use as a fuel as such, nor for addition to a "pool". This is because the fuel has to meet certain specifications, including, in particular, specifications with respect to the aromatics content. Because it is both environmentally advisable and increasingly legally required, it will become ever more necessary to reduce the aromatics content of fuels such as diesel oils and kerosene.

A common method to reduce the aromatics content of hydrocarbon feedstocks is to contact said feedstocks in the presence of a hydrogen-containing gas with a hydrogenation catalyst to effect aromatics hydrogenation. Aromatics hydrogenation catalysts have been described extensively in the art.

For example, U.S. Pat. No. 3,703,461 describes a catalyst to be used in the hydrogenation of aromatics which comprises one or more of the metals of platinum or palladium on a carrier consisting of silica-alumina dispersed in alumina binder. An alumina binder amount of 50–90 wt. % is preferred, with an alumina binder amount of 60–80 wt. % being most preferred. The catalysts used in the Examples of this reference all contain platinum as the only Group VIII noble metal.

Further, JP 09225304 discloses a catalyst to be used for the hydrogenation of aromatics comprising platinum on a carrier consisting of silica-alumina dispersed in an alumina binder. The carrier preferably comprises 50–95 wt. % of alumina binder and most preferably 60–90 wt. % of alumina binder.

M. Vaarkamp et al. (Engelhard), *Prepr.-Am. Chem. Soc., Div. Pet. Chem.* 43(1), 77–79 (1998) discloses a catalyst to be used for the hydrogenation of aromatics comprising a combination of platinum and palladium on various inorganic supports. These supports are selected from alumina, silica, silica-alumina, and magnesia.

EP 0947248 describes a catalyst to be used in the hydrogenation of aromatics which comprises a combination of platinum and palladium on a support comprising silica-alumina and about 7 wt. % of an alumina binder. The silica-alumina comprises 60–80 wt. % of alumina.

PCT/NL98/00090 describes a catalyst to be used, int. al., in the hydrogenation of aromatics which comprises a combination of platinum and palladium on a silica-alumina carrier. The silica-alumina may comprise, e.g., 10 wt. % of alumina and 90 wt. % of silica. In a comparative example this publication describes the use of a catalyst containing a combination of platinum and palladium on a carrier comprising silica-alumina and 30 wt. % of an alumina binder, wherein the silica-alumina contains 13 wt. % of alumina, in the hydrogenation of a feedstock containing 8 wt. % of aromatics. In view of the low aromatics content of the feedstock and the fact that it is a comparative example, the skilled person would not consider this catalyst suitable for use in the hydrogenation of aromatics.

sulfur

SUMMARY OF THE INVENTION

In one embodiment, the present invention pertains to a process for effecting aromatics hydrogenation which process comprises contacting a hydrocarbon feedstock which contains 10–80 vol. % of aromatics in the presence of a hydrogen-containing gas with a catalyst comprising hydrogenation metals on a carrier, wherein (i) the hydrogenation metals comprise a combination of platinum and palladium, and (ii) the carrier comprises silica-alumina dispersed in an alumina binder, wherein the alumina binder is present in an amount of 5–50 wt. %, based on the total weight of the silica-alumina and alumina binder present in the carrier, and wherein the silica-alumina comprises 5–50 wt. % of alumina, based on the weight of the silica-alumina.

Other embodiments of the invention are concerned with details involving catalyst and feedstock properties and composition, each of which will be described in detail hereinbelow.

DETAILED DESCRIPTION OF THE INVENTION

Surprisingly, it has been found that if in a process for hydrogenation of hydrocarbon feedstocks comprising 10–80 vol. % of aromatics, a catalyst is applied which comprises a combination of platinum and palladium supported on a carrier comprising silica-alumina dispersed in an alumina binder wherein the amount of alumina binder is 5–50 wt. %, based on the total weight of the silica-alumina and alumina binder present in the carrier, and wherein the silica-alumina comprises 5–50 wt. % of alumina, based on the weight of the silica-alumina, the yield with respect to hydrogenated aromatics can be increased considerably in this process.

More in particular, the use of a combination of platinum and palladium leads to an increased yield as compared to a catalyst comprising only one Group VIII noble metal, in particular platinum. Further, the selection of a carrier comprising an alumina binder in an amount of 5–50 wt. % as in the present invention leads to an increase in yield as compared to a catalyst which comprises more than 50 wt. % of alumina binder. Furthermore, a catalyst containing a carrier wherein the silica-alumina comprises 5–50 wt. % of alumina, according to the present invention, has improved activity and stability compared to a catalyst containing a carrier wherein the silica-alumina comprises more than 50 wt. % of alumina.

Additionally, it has been found that the catalyst according to the present invention shows high hydrodesulfurization activity, particularly in the case of gas oil feeds.

Incidentally, it is noted that a catalyst suitable for use in the present process was already described in EP 0587246.

However, there it is used in the hydroconversion of feeds produced by Fischer Tropsch synthesis. These feeds do not contain aromatics.

The Feedstock Used in the Process of the Invention

The hydrocarbon feedstock comprises at least 10 vol. % of aromatics, preferably at least 20 vol. % of aromatics, and more preferably at least 30 vol. %. The aromatics content of the hydrocarbon feedstock does not exceed 80 vol. %, preferably it does not exceed 50 vol. %.

A preferred feedstock will substantially boil at a temperature below 440° C., preferably below 371° C., meaning that at least 90 vol. % of the feedstock will boil below said temperature. Preferably, the feedstock substantially boils above 80° C., meaning that at least 90 vol. % of the feedstock will boil above said temperature. Preferably, the feedstock has a boiling range of 140° to 371° C.

The above feedstocks may be acquired by the conventional route from higher-boiling feedstocks by means of cracking or hydrocracking processes, optionally followed by fractionation of the cracking or hydrocracking products. It is preferred to avoid feedstocks with too high sulfur and/or nitrogen contents, not only because such impurities are objectionable to the final product but also because they have a detrimental effect on the catalyst's action. In general, the sulfur content of the feedstock, calculated as S, is less than 0.05 wt. %, preferably less than 0.03 wt. %, more preferably less than 0.01 wt. %, and the nitrogen content of the feedstock, calculated as N, likewise is less than 0.05 wt. %, preferably less than 0.015 wt. %. If the available feedstock contains a too high content of either or both of these impurities, it must be hydrodesulfurized and/or hydrodenitrogenated with a catalyst in an otherwise conventional manner.

The Catalyst Used in the Process of the Invention

As stated above, the catalyst used in the process of the present invention comprises a carrier which comprises silica-alumina dispersed in an alumina binder wherein the alumina binder is present in an amount of 5–50 wt. %, based on the total weight of the silica-alumina and the alumina. Preferably, the alumina binder is present in amount of 15–30 wt. %, based on the total weight of the silica-alumina and alumina binder present in the carrier. The silica-alumina contained in the carrier comprises 5–50 wt. % of alumina, based on the weight of the silica-alumina, preferably 10–40 wt. %, more preferably 15–30 wt. %. If the silica-alumina comprises more than 50 wt. % of alumina, the activity and the stability of the catalyst become insufficient. The total amount of alumina present in the carrier preferably is between 10 and 60 wt. %, more preferably between 25 and 50 wt. %.

The carrier generally contains less than 20 wt. % of components other than silica-alumina and alumina. Such components may comprise titania, silica-magnesia, or zirconia. Preferably, the carrier comprises less than 10 wt. %, more preferably less than 5 wt. % of other components and most preferably, the carrier consists essentially of silica-alumina dispersed in the alumina binder. The term "consisting essentially of" in this context does not exclude those components being present as impurities in small amounts, as long as they do not take away from the performance of the catalyst.

As stated above, the hydrogenation metals present in the catalyst used in the process of the present invention comprise a combination of platinum and palladium. Preferably, the hydrogenation metals consist essentially of a combination of platinum and palladium. Again, the term "consist essentially of" does not exclude hydrogenation metals other than platinum and palladium being present as impurities in small amounts, as long as they do not take away from the performance of the catalyst.

Hydrogenation metals in the sense of the present invention are any metals which are able to hydrogenate aromatic compounds under the process conditions given below. Apart from platinum and palladium, typical hydrogenation metals are the Group VIII non-noble metals, e.g. cobalt and nickel, the Group VIB metals, such as molybdenum and tungsten, and the group of rare earth metals.

The total amount of platinum and palladium, calculated as metals on the total weight of the catalyst, present in the catalyst to be used in the process according to the invention generally is between 0.1 and 3 wt. %, preferably between 0.2 and 2 wt. %, more preferably between 0.5 and 2 wt. %. Generally, platinum and palladium will each be present in an amount of 0.05–1.5 wt. %, preferably between 0.1 and 1 wt. %, more preferably between 0.25 and 1 wt. %. Depending on the feeds to be treated and the process conditions at issue, catalysts containing either 0.25–0.5 wt. % of both platinum and palladium or catalysts containing 0.5–1 wt. % of both platinum and palladium may be preferred.

Preferably, the platinum and the palladium are highly dispersed in the carrier. In the context of the present specification the dispersion is defined as the fraction of metal atoms present at the surface of the metal particles. The dispersion can thus range between 0% (very large metal particles) and 100% (very small metal particles). The dispersion preferably is higher than 20%, more preferably higher than 50%. It can be determined by various techniques known in the art, e.g., by way of $H_2$ titration as described by Mears and Hansford in *J. Catal.* 9 (1967) pp. 125–134 or by Prelazzi, Cerboni, and Leofanti in *J. Catal.* 181 (1999) pp. 73–79, assuming that one mole hydrogen ($H_2$) corresponds to 1 mole platinum or palladium.

It is further preferred that the catalyst used in the process of the present invention has a pore volume, measured by water intrusion, of at least 0.6 ml/g. A preferred catalyst further has a surface area of at least 300 $m^2/g$ as determined by way of nitrogen adsorption (BET).

The catalyst can be prepared by processes known in the art. For example, the carrier comprised in the catalyst used in the process of the present invention may be prepared by a process which comprises (a) mixing silica-alumina with alumina or a precursor thereof, optionally in the presence of a suitable liquid, (b) shaping the resulting mixture by means of, e.g., extrusion, (c) drying the shaped material, and (d) optionally calcining the dried material.

Mixing step (a) may comprise mulling the silica-alumina and the alumina (precursor). A suitable alumina precursor is boehmite.

A suitable liquid that may be applied in mixing step (a) may comprise water, alcohols, such as methanol, ethanol or propanol, ketones, such as acetone, aldehydes, such as propanal, and aromatic liquids, such as toluene. The use of water is preferred, both for reasons of cost and for environmental reasons.

Preferably, a peptizing agent is present during mixing step (a). Suitable peptizing agents comprise acidic compounds, such as inorganic acids, e.g., an aqueous solution of hydrogen fluoride, hydrogen bromide, and hydrogen chloride, nitric acid, nitrous acid, and perchloric acid, as well as organic acids, such as acetic acid, propionic acid, and butanoic acid. The amount of peptizing agent preferably is chosen such that it is sufficient to peptize the alumina present in the mixture.

Shaping step (b) may be carried out by suitable methods known in the art, e.g., by way of extrusion, granulation, beading, tablet pressing, pill making, briquetting, etc.

Drying step (c) preferably is performed at a temperature of 0–200° C., more preferably 70–150° C., generally in air. Calcination step (d) preferably is carried out at a temperature of 300–800° C., preferably 450–700° C., generally in air.

Palladium and platinum may be incorporated, e.g., during mixing step (a) by comulling. Alternatively, the metals may be incorporated, e.g., after the drying and/or calcination step by way of impregnation. Impregnation can be done by contacting the carrier with an impregnation solution comprising a soluble salt or complex of platinum and palladium. The impregnation solution may contain additional components which stabilize the solution or influence the distribution of the metals over the carrier. For example, if a homogeneous metal distribution is desired, a strongly acid impregnation solution, such as an impregnation solution containing, as additional components, HCl or HNO$_3$ may be applied.

Suitable palladium compounds for use in an impregnation solution include H$_2$PdCl$_4$, palladium nitrate, palladium(II) chloride, and complexes thereof. The use of (NH$_3$)$_4$Pd (NO$_3$)$_2$ is preferred. Suitable platinum compounds for use in the impregnation include hexachloroplatinic acid, optionally in the presence of hydrochloric acid, platinum amine hydroxide, and various platinum amine complexes. The latter compounds are considered preferred. The platinum and palladium compounds can be impregnated sequentially or, more preferably, simultaneously.

After the impregnation, the catalyst preferably is dried and/or calcined. Suitable drying conditions include a temperature of 0–200° C., preferably 75–150° C. Suitable calcination conditions include a temperature of 200–600° C., preferably 350–500° C.

Process Conditions

The process of the present invention preferably is carried out at a temperature in the range of 120° to 382° C. The overall pressure preferably is in the range of 10 to 200 bar, and the partial hydrogen pressure preferably is in the range of 5 to 180 bar. The liquid hourly space velocity (LHSV) generally is in the range of 0.2 to 5 h$^{-1}$.

The conditions selected should be such that substantially no cracking will occur. In the present context, conditions under which substantially no cracking will occur are defined as conditions under which less than 20 wt. % of the hydrocarbons in the feed with a boiling point above 196° C. is converted to product hydrocarbons with a boiling point below 196° C. The conversion to products boiling below 196° C. is given by the following formula:

$$\text{Conv}(196° \text{ C.}^-)(\text{wt \%}) = \frac{(\text{wt product}(196° \text{ C.}^-)) - (\text{wt feed}(196° \text{ C.}^-))}{\text{wt total feed}} \times 100\%$$

The degree to which the aromatics are hydrogenated in the process according to the invention in any given case is of course dependent on the nature of the catalyst, the nature of the feedstock, and the process conditions. Still, generally more than 15 vol. %, preferably more than 30 vol. %, and in particular more than 50 vol. %, of the aromatics present in the feedstock will be hydrogenated. The resulting product usually contains less than 30 vol. % of aromatics, preferably less than 20 vol. %, most preferably less than 5 vol. %.

EXAMPLES

General Catalyst Preparation Procedure

Appropriate amounts of pseudoboehmite alumina, a silica-alumina, and a nitric acid solution (1N) were mixed. The mixture was kneaded and extruded to form extrudates with a diameter of 1.5 mm. The extrudates were dried overnight at 120° C., heated to a temperature of 600° C. under nitrogen, and subsequently calcined in air for one hour at that temperature.

An impregnation solution was prepared from suitable amounts of (NH$_3$)$_3$Pt(NO$_3$)$_3$ and/or (NH$_3$)$_3$Pd(NO$_3$)$_3$ with nitric acid. The extrudates were impregnated by way of pore volume saturation at room temperature. The impregnated extrudates were dried at 120° C., and subsequently calcined for 1 hour at 400° C. in air.

Using the above-described general procedure, the following catalysts were prepared, namely Catalysts A, B, and C according to the invention and Catalysts 1, 2, 3, and 5 which are comparative. Comparative Catalyst 4 is a commercially available catalyst. The composition of the catalysts is given in the following tables:

|  | A | B | C |
|---|---|---|---|
| alumina binder (wt. % on carrier) | 20 | 20 | 20 |
| silica-alumina (wt. % on carrier) | 80 | 80 | 80 |
| alumina in silica-alumina (wt. %) | 25 | 25 | 25 |
| Pt (wt. % on catalyst) | 0.56 | 0.7 | 0.35 |
| Pd (wt. % on catalyst) | 0.56 | 0.7 | 0.35 |

|  | 1 | 2 | 3 | 4 | 5 |
|---|---|---|---|---|---|
| alumina binder (wt. % on carrier) | 80 | 20 | 20 | 0 | 20 |
| silica-alumina (wt. % on carrier) | 20 | 80 | 80 | 100 | 80 |
| alumina in silica-alumina (wt. %) | 25 | 25 | 25 | 13 | 68 |
| Pt (wt. % on catalyst) | 0.56 | 1.1 | 0 | 0.7 | 0.7 |
| Pd (wt. % on catalyst) | 0.56 | 0 | 1.1 | 0 | 0.7 |

Example 1

Catalyst A and Comparative Catalysts 1, 2, and 3 were tested in the hydrogenation of aromatics in diesel in accordance with the following procedure.

First, the catalyst was ground and sieved to obtain the 10–16 mesh fraction. Then the catalyst was loaded in a tubular reactor. The catalyst was activated by reduction in pure hydrogen at 400° C. for four hours at 5 bar H$_2$ pressure. The catalyst was contacted with a feed with the properties given below. The original sulfur content of the feed was 3 ppm. Dibenzothiophene was added to provide a final sulfur content of 100 ppm.

| Diesel | |
|---|---|
| Sulfur | 100 ppmwt |
| Nitrogen | 3.2 ppmwt |

-continued

| Distillation (ASTM-D 2892) | |
|---|---|
| IBP | 173° C. |
| 10 vol. % | 239° C. |
| 50 vol. % | 274° C. |
| 95 vol. % | 316° C. |
| FBP | 366° C. |
| Aromatics | |
| Mono-aromatics | 21.3 wt. % |
| Di-aromatics | 2.9 wt. % |
| Tri+ aromatics | 0 wt. % |

In the above, Mono, Di, and Tri+ stand for mono-ringed aromatics, di-ringed aromatics, and aromatic compounds with three or more rings, respectively.

The tests were carried out at a pressure of 40 bar, a $H_2$/oil ratio of 750 Nl/l, and a liquid hourly space velocity (LHSV) of 1.5 h−1. The temperature was selected to obtain 5 wt. % of monoaromatics in the product. The following table gives the required operating temperature for each catalyst to obtain 5 wt. % of mono-aromatics in the product after 160 hours of operation.

| | ROT (° C.) |
|---|---|
| A (invention) | 232° C. |
| 1 (comparative) | 290° C. |
| 2 (comparative) | 260° C. |
| 3 (comparative) | 258° C. |

It appears that the use of the catalyst according to the invention, which contains both platinum and palladium on a silica-alumina in alumina carrier which contains less than 50% of alumina binder, results in a process which can be operated at a lower temperature to get the same aromatics content in the product.

Example 2

Catalyst B according to the invention and Comparative Catalyst 4, which contains only Pt and does not contain an alumina binder, were tested in the hydrogenation of aromatics in kerosene. The properties of the kerosene were as follows:

| Kerosene | |
|---|---|
| Density at 15° C. (g/ml) | 0.8166 |
| Distillation (ASTM-D 2892) | |
| 95 vol. % | 252° C. |
| FBP | 262° C. |
| Total Aromatics | 23.9 vol. % |
| Polynuclear aromatics (PNA) | 2.6 wt. % |

The test conditions are given in the next table, together with the test results.

| | Run 1 | run 2 | |
|---|---|---|---|
| Catalyst | B | B | 4 |
| T (° C.) | 159 | 204 | 250 |
| LHSV (h-1) | 2.7 | 3.1 | 2.7 |
| H2/feed (Nl/l) | 460 | 400 | 460 |
| P (bar) | 35 | 35 | 35 |
| Total aromatics | 0.7 vol. % | 480 ppm | 0.6 vol. % |
| Polynuclear aromatics | 0 | 0 | 0 |

From run 1 it can be seen that Catalyst B according to the invention is a breakthrough compared to Commercial Catalyst 4. Under otherwise identical conditions Catalyst B can be operated at 90° C. less than Catalyst 4 to obtain the same aromatics level. Run 2 shows that very low aromatics contents can be obtained at high space velocities and low temperature.

Example 3

Catalysts B and C, which have the same composition except for the metals content, were tested in the hydrogenation of aromatics in a gas oil feed. The properties of the gas oil were as follows:

| Gas oil 1 | |
|---|---|
| Sulfur | 48 ppmwt |
| Density at 15° C. (g/ml) | 0.8376 |
| cetane number | 53 |
| Distillation (ASTM-D 2892) | |
| 95 vol. % | 333° C. |
| FBP | 341° C. |
| Total Aromatics | 26.7 wt. % |
| Polynuclear aromatics (PNA) | 4.6 wt. % |

The test conditions are given in the next table, together with the test results.

| | Catalyst | |
|---|---|---|
| | B | C |
| T (° C.) | 240 | 240 |
| LHSV (h-1) | 1 | 1 |
| H2/feed (Nl/l) | 750 | 750 |
| P (bar) | 50 | 50 |
| S conversion (%) | 44 | 35 |
| Total aromatics | 11 wt. % | 14 wt. % |
| Polynuclear aromatics | 0 | 0 |

This data shows that Catalyst C, which has a much lower metals content than Catalyst B, also gives good aromatics hydrogenation.

Example 4

Catalyst B was tested in the hydrogenation of aromatics in a further gas oil feed under different process conditions. The properties of the gas oil were as follows:

| | Gas oil 2 | |
|---|---|---|
| | Sulfur | 260 ppmwt |
| | Density at 15° C. (g/ml) | 0.8272 |
| | cetane number | 57 |
| | Distillation (ASTM-D 2892) | |
| | 95 vol. % | 334° C. |
| | FBP | 342° C. |
| | Total Aromatics | 26.8 wt. % |
| | Polynuclear aromatics (PNA) | 2.4 wt. % |

The test conditions are given in the next table, together with the test results.

| | Run 1 | Run 2 |
|---|---|---|
| T (° C.) | 240 | 260 |
| LHSV (h-1) | 1 | 1 |
| H2/feed (Nl/l) | 750 | 750 |
| P (bar) | 50 | 50 |
| S conversion (%) | 36 | 62 |
| Total aromatics | 21.8 wt. % | 13.1 wt. % |
| Polynuclear aromatics | 1.2 wt. % | 0.7 wt. % |

This data shows that by selecting proper process conditions the saturation of monoaromatics and polyaromatics can be selected. High sulfur conversions can be obtained.

Example 5

Catalyst B according to the invention and Comparative Catalyst 5, which has the same composition as Catalyst B, except that it contains more than 50 wt. % of alumina in the silica-alumina, were tested in the hydrogenation of aromatics in a gas oil feed. The properties of the feed are described in Example 3. The following test conditions were used: LHSV=1 h$^{-1}$, H$_2$/feed=750 Nl/l, P=50 bar.

The results are summarized in FIG. 1. The data shows that the start-of-run (initial) activity of Catalyst B according to the invention is much higher than that of Comparative Catalyst 5.

Example 6

The activity of Catalyst B and Comparative Catalyst 5 as a function of the time on stream was tested in the hydrogenation of aromatics in the gas oil feed described in Example 3 under the conditions given in Example 5.

Figure 2:
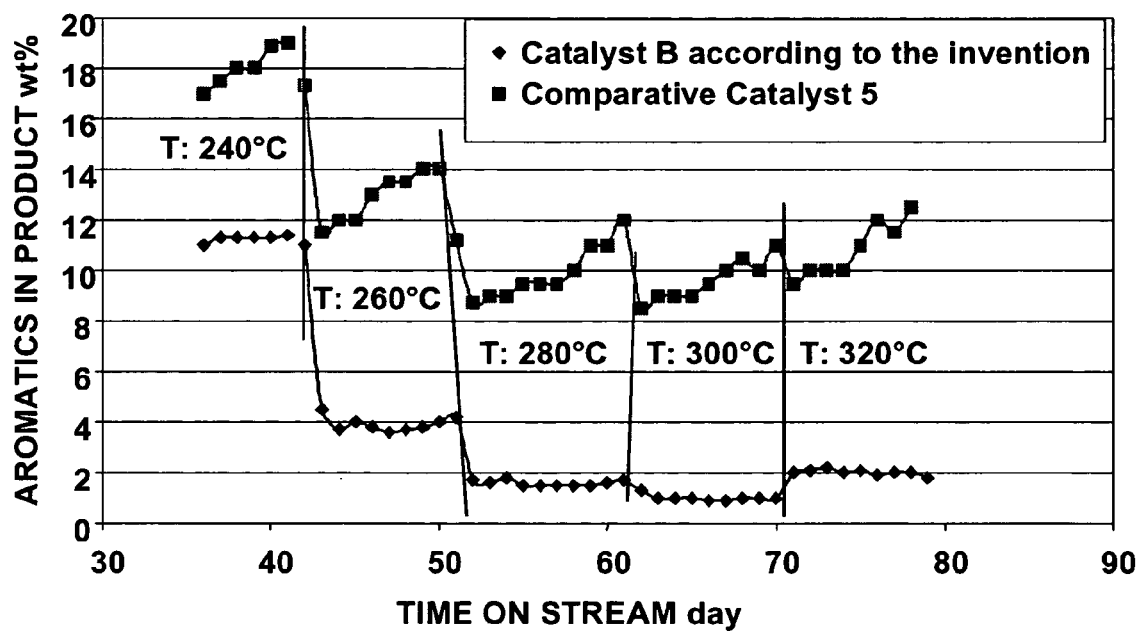

The results are shown in FIG. 2. The difference in activity between Catalyst B and Comparative Catalyst 5 increases with time on stream. While Catalyst B shows no deactivation (total time on stream over 90 days), Comparative Catalyst 5 deactivates quickly. Thus, Catalyst B according to the invention has a much better stability than Comparative Catalyst 5.

The invention claimed is:

1. A process for effecting aromatics hydrogenation which process comprises contacting a hydrocarbon feedstock which contains 10–80 vol. % of aromatics in the presence of a hydrogen-containing gas with a catalyst comprising hydrogenation metals on a carrier, wherein
   (i) the hydrogenation metals comprise a combination of platinum and palladium, and
   (ii) the carrier comprises silica-alumina dispersed in an alumina binder, wherein the alumina binder is present in an amount of 5–50 wt. %, based on the total weight of the silica-alumina and alumina binder present in the carrier, and wherein the silica-alumina comprises 5–50 wt. % of alumina, based on the weight of the silica-alumina.

2. The process of claim 1 wherein the hydrocarbon feedstock has a boiling point below 440° C.

3. The process of claim 1 wherein the carrier contains 15–30 wt. % of the alumina binder, based on the total weight of the silica-alumina and alumina binder present in the carrier.

4. The process of claim 1 wherein the silica-alumina contained in the carrier comprises 15–30 wt. % of alumina, based on the weight of the silica-alumina.

5. The process of claim 1 wherein the hydrogenation metals comprised in the catalyst consist essentially of a combination of platinum and palladium.

6. The process of claim 1 wherein the catalyst comprises at least 0.1 wt. % of platinum and at least 0.1 wt. % of palladium, calculated as metals, based on the total weight of the catalyst.

7. The process of claim 6 wherein platinum and palladium are each present in an amount of 0.25–1.0 wt. %, calculated as metals.

8. The process of claim 1 wherein the platinum and the palladium are highly dispersed in the carrier.

* * * * *